(12) United States Patent
Asakura et al.

(10) Patent No.: US 6,531,329 B2
(45) Date of Patent: Mar. 11, 2003

(54) METHOD OF MANUFACTURING LIQUID CRYSTAL DISPLAY PANEL

(75) Inventors: Tetsuroh Asakura, Tokyo (JP); Takeshi Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/885,359

(22) Filed: Jun. 18, 2001

(65) Prior Publication Data

US 2001/0055827 A1 Dec. 27, 2001

(30) Foreign Application Priority Data

Jun. 20, 2000 (JP) ........................................ 2000-185488

(51) Int. Cl.⁷ ............................................. H01L 21/00
(52) U.S. Cl. ..................... 438/30; 349/189; 349/153; 349/154; 349/155
(58) Field of Search ............................. 438/30; 257/59; 349/5, 153

(56) References Cited

U.S. PATENT DOCUMENTS

| | | | | |
|---|---|---|---|---|
| 4,770,498 A | * | 9/1988 | Aoki et al. ................... | 350/334 |
| 5,307,190 A | * | 4/1994 | Wakita et al. ................ | 359/82 |
| 5,640,260 A | * | 6/1997 | Sumida ........................ | 349/26 |
| 5,701,165 A | * | 12/1997 | Kubo et al. .................... | 349/5 |
| 5,889,568 A | * | 3/1999 | Seraphim et al. ............. | 349/73 |
| 5,952,676 A | * | 9/1999 | Sato et al. ..................... | 257/59 |
| 5,966,194 A | * | 10/1999 | Hu et al. ..................... | 349/153 |
| 5,982,466 A | * | 11/1999 | Choi et al. ................... | 349/124 |
| 6,122,033 A | * | 9/2000 | Mathew et al. ............. | 349/155 |
| 6,285,435 B1 | * | 9/2001 | Inoue et al. ................ | 349/189 |

FOREIGN PATENT DOCUMENTS

| | | |
|---|---|---|
| JP | 56-155920 | 12/1981 |
| JP | 3-255422 | 11/1991 |

* cited by examiner

Primary Examiner—David Nelms
Assistant Examiner—Thao P. Le
(74) Attorney, Agent, or Firm—Katten, Muchin, Zavis Rosenman

(57) ABSTRACT

Provided is a method of manufacturing a liquid crystal display panel of high quality without wasting liquid crystal material. In a step for pressing both of transparent glass substrates against each other, liquid crystal spreads and air bubbles are exhausted through notch portions. A sealing material is crushed before the liquid crystal reaches the notch portions, and the notch portions are blocked. Accordingly, a gap between the transparent glass substrates is sealed in a state where the liquid crystal is filled therein. Moreover, at the same time, both of the transparent glass substrates are compressively attached to each other with the sealing material interposed therebetween.

18 Claims, 16 Drawing Sheets

11a; residual gas

1; liquid crystal display panel
3; transparent glass substrate
4; liquid crystal layer
2; transparent glass substrate 201; transparent glass substrate
202; sealing material 204; transparent glass substrate
202H
201
203; liquid crystal
202

204
203   202   201

301; transparent glass substrate
302H
302; sealing material

304; transparent glass substrate
302H
301
302
303; liquid crystal 304
305
301
302
303

METHOD OF MANUFACTURING LIQUID CRYSTAL DISPLAY PANEL

BACKGROUND OF THE INVENTION

1. Field of the Invention

The present invention relates to a method of manufacturing a liquid crystal display panel used for a display device.

The present application claims priority of Japanese Patent Application No. 2000-85488 filed on Jun. 20, 2000, which is hereby incorporated by reference.

2. Description of the Related Art

A liquid crystal display panel has been heretofore widely used as a display device such as a TV monitor and as a display device for office automation equipment. As a method of manufacturing this liquid crystal display panel, there is known a method in which a sealing material is coated onto a periphery portion of one of a pair of transparent glass substrates, liquid crystal is dropped on this transparent glass substrate, and then the two transparent glass substrates superposed upon another are compressively attached to each other, and a method in which a pair of opposite transparent glass substrates are attached to each other with a gap therebetween, and the gap is sealed after injecting liquid crystal into the gap.

As shown in FIG. 14A and FIG. 15, as a method to drop the liquid crystal, there is a method in which spacers 102 of a thickness t, which serve to regulate a gap between the transparent glass substrates 101 and 106, are scattered on one transparent glass substrate 101, on which signal lines and scanning lines (not shown) are arranged in a matrix fashion, and a TFT and a pixel electrode (not shown) are connected to each crossing point of the signal lines and the scanning lines, and a sealing material 103 is coated onto an angular ling portion of a display area having a longitudinal dimension a and a lateral dimension b so that the sealing material 103 surrounds a peripheral portion thereof with a predetermined height h.

Next, as shown in FIG. 14B, liquid crystal 104 of a prescribed amount VL is dropped, for example, at a central portion of the display area surrounded by the sealing material 103. This prescribed amount VL is equal to a volume of a space formed between the transparent glass substrates 101 and 106 at the time when the later-described gap between the transparent glass substrates 101 and 106 becomes a prescribed value, and VL is equal to abt.

Next, as shown in FIG. 14C, the transparent glass substrate 101 mounting the liquid crystal 104 is inserted in a vacuum pressure decompression bath 105, and the other transparent glass substrate 106 in which a common electrode and a color filter (not shown) are arranged is superposed on the transparent glass substrate 101 while keeping a pressure of the vacuum decompression bath 105 at a predetermined pressure p1. At this time, residual gas 107 of a volume V1 occupies a predetermined space.

Subsequently, compressive force is gradually applied to the transparent glass substrates 101 and 106. AS shown in FIG. 14D, the transparent glass substrates 101 and 106 are pressed against each other to be compressively attached until an interval between the transparent glass substrates 101 and 106 becomes the foregoing prescribed value equal to the height t of the spacer 102. Furthermore, the pressure in the vacuum decompression bath 105 is restored to an atmospheric pressure p0, and thus the liquid crystal panel in which the liquid crystal 104 is sealed is obtained. At this time, the residual gas 107 is also compressed and visually recognized as air bubbles of a volume V2.

For example, when the prescribed amount VL of the liquid crystal 104 and the volume V1 of the residual gas 107 are calculated for a 14-inch type liquid crystal display panel, the prescribed amount VL (=abt) is 310.65 mm$^3$ and the volume V1 (=abh−VL) is 1553.21 mm$^3$, assuming a=216.1 mm, b=287.5 mm, t=0.005 mm, h=0.03 mm, and p1=1 Pa.

A volume V2 (=V1p1/p0) of the residual gas 107 after being compressed is calculated to be 0.015 mm when p0=1.013×10$^5$ Pa. If the shape of the residual gas (air bubble) 107 is assumed to be cylindrical, a cross section S (=V2/t) [mm$^2$] of the residual gas (air bubble) 107 is 3 mm$^2$, and a diameter f thereof is 1.9 mm.

As described above, the residual gas 107 visually recognized in the display area are sealed in the liquid crystal display panel causing a problem that a quality degradation of the liquid crystal display panel is brought about.

Therefore, for example, in Japanese Patent Laid-open No. Sho56-155920 and No. Hei03-255422, disclosed are techniques in which after a sealing material is coated onto a peripheral portion of one of a pair of transparent glass substrates, liquid crystal is dropped onto one of the transparent glass substrates so as to fill a gap between the pair of the transparent glass substrates and air bubbles are ejected from the gap. The techniques disclosed in Japanese Patent Laid-open No. Sho56-155920 and No. Hei03-255422 are hereinafter referred to as a first prior art and a second prior art respectively.

In the first prior art, as shown in FIG. 16A, after spacers (not shown) are scattered on a transparent glass substrate 201, an ultraviolet-curing sealing material 202 is coated onto a peripheral portion of the transparent glass substrate 201.

Next, as shown in FIG. 16B, a liquid crystal 203 is dropped onto the transparent glass substrate 201, and an other transparent glass substrate 204 facing the transparent glass substrate 201 is superposed thereon. At this time, a quantity of the liquid crystal 203 dropped is set larger than that necessary for displaying.

Subsequently, an ultraviolet ray is radiated onto the sealing material 202 except for a predetermined ejection portion 202H to cure the sealing material 202, and both of the transparent glass substrates 201 and 204 are pressed from both sides thereof. The liquid crystal 203 fills a gap between both of the transparent glass substrates 201 and 204. A surplus amount of the liquid crystal 203 is ejected through the ejection portion 202H outside the sealing material 202. Simultaneously, air bubbles are also exhausted.

Then, as shown in FIG. 16C, an ultraviolet ray is irradiated onto the ejection portion 202H of the sealing material 202 to cure it, thus sealing the liquid crystal 203 between the transparent glass substrates 201 and 204.

In the second prior art, as shown in FIG. 17A, after spacers (not shown) are scattered on a transparent glass substrate 301, a sealing material 302 is coated on a peripheral portion of the transparent glass substrate 301. At this time, an opening portion 302H is provided in a part of a coating pattern of the sealing material 302.

Next, as shown in FIG. 17B, a liquid crystal 303 is dropped on the transparent glass substrate 301, and an other transparent glass substrate 304 facing the transparent glass substrate 301 is superposed thereon. At this time, a quantity of the dropped liquid crystal 303 is set larger than that necessary for displaying.

Both of the transparent glass substrates 301 and 304 are pressed from both sides thereof, and the liquid crystal 303 fills a gap between the transparent glass substrates 301 and 304. Then, a surplus amount of the liquid crystal 303 is ejected from the opening portion 302H. At this time, air bubbles are simultaneously exhausted.

Then, as shown in FIG. 17C, the sealing material 302 is cured, and the opening portion 302H is sealed by an adhesive 305.

However, in the foregoing first and second prior arts, there is a problem that the surplus amounts of the liquid crystal 203 and 303 are needed and expensive liquid crystal material is wasted.

Furthermore, in the first prior art, since the surplus amount of the liquid crystal 203 is exhausted to the outside over the sealing material 202, there is a problem that the sealing material 202 is also swept away together with the liquid crystal 203 in exhausting the liquid crystal 203, thus lowering adhesion. Moreover, there is a problem that a contaminant is mixed in the liquid crystal 203 from the outside through the flowing-out portion in the sealing material 202, and gas flows into the liquid crystal 203, thus degrading quality of the liquid crystal display panel.

In the second prior art, since a step for sealing the opening portion 302H is inevitable in addition to a step for curing the sealing material 302, there is a problem that it the manufacturing steps of the liquid crystal display panel take a lot of troubles and an increase in cost is brought about.

SUMMERY OF THE INVENTION

In view of the above, it is an object of the present invention to provide a method of manufacturing a liquid crystal display panel capable of manufacturing a high quality liquid crystal display panel without wasting liquid crystal and without making manufacturing steps troublesome.

According to a first aspect of the present invention, there is provided a method of manufacturing a liquid crystal display panel in which liquid crystal is held between a pair of panel substrates facing each other, on which an electrode is formed, includes: a step for coating a sealing material on a plane of at least one of the panel substrates, on which the electrode is formed, with a predetermined coating pattern having a notch portion; a step for dropping the liquid crystal on the plane of at least one of the panel substrates, on which the electrode is formed, with a predetermined dropping pattern; a step for superposing both of the panel substrates upon another while sandwiching the sealing material and the liquid crystal between both of the panel substrates; and a step for pressing both of the panel substrates against each other, wherein in the sealing material coating step, a notch width of the notching portion is set to a value so that the notch portion is blocked after the both of the panel substrates are pressed against each other in the substrate pressing step.

In the foregoing first aspect, a preferable mode is one wherein in the sealing material coating step, the notch width of the notch portion is set so that the notch portion is blocked before the liquid crystal reaches the notch portion after starting to press both of the panel substrates in the substrate pressing step.

Also, a preferable mode is one wherein in the sealing material coating step, the notch width of the notch portion is set to be equal to an increased amount of a width of the sealing material or less, which is obtained by subtracting a width of the sealing material when the sealing material is coated in the sealing material coating step from a width of the sealing material after both of the panel substrates are pressed against each other in the substrate pressing step.

Also, a preferable mode is one wherein in the sealing material coating step, a plurality of notch portions are provided, and of two notch portions selected arbitrarily from the plurality of notch portions, a notch width of one notch portion which the liquid crystal reaches earlier than the other notch portion in the substrate pressing step is set to be smaller than that of the other notch portion which the liquid crystal reaches later.

Also, a preferable mode is one wherein in the sealing material coating step, the notch width of the notch portion is set to approximately 0.75 times the increased amount of the width of the sealing material.

Also, a preferable mode is one wherein a quantity of the liquid crystal dropped in the liquid crystal dropping step is set to be equal to a volume of a layer-shaped space or less, which is formed by both of the panel substrates and the sealing material immediately after both of the panel substrates are superposed in the substrate pressing step.

Also, a preferable mode is one wherein the quantity of the liquid crystal dropped in the liquid crystal dropping step is set to be approximately equal to a volume of the layer-shaped space formed by both of the panel substrates and the sealing material after both of the panel substrates are pressed against each other in the substrate pressing step.

Also, a preferable mode is one wherein in the substrate pressing step, by pressing both of the panel substrates against each other, both of the panel substrates are compressively attached to each other, the liquid crystal is allowed to fill the layer-shaped space, residual gas is exhausted from the layer-shaped space through the notch portion, and the notch portion provided in the sealing material coating step is blocked.

Also, a preferable mode is one wherein in the liquid crystal dropping step, the predetermined dropping pattern is adopted based on at least dimensions of the display area used for displaying, which is the plane of the panel substrate where the electrode is formed.

Also, a preferable mode is one wherein in the sealing material coating step, the predetermined coating pattern is adopted based on at least dimensions of the display area used for displaying, which is the plane of the panel substrate where the electrode is formed.

Also, a preferable mode is one wherein in the sealing material coating step, the sealing material is coated so as to show approximately an angular ring appearance with predetermined width and height.

Also, a preferable mode is one wherein in the sealing material coating step, the sealing material is coated so that the notch portion is formed at least in a corner of the display area, and in the liquid crystal dropping step, the liquid crystal is dropped on a central portion of the display area.

Also, a preferable mode is one wherein the dropping pattern of the liquid crystal is set based on an aspect ratio of the display area.

According to a second aspect of the present invention, there is provided a method of manufacturing a liquid crystal display panel in which liquid crystal is held between a pair of panel substrates facing each other, on which an electrode is formed, includes: a step for coating a sealing material on a plane of at least one of the panel substrates, on which the electrode is formed, with a predetermined coating pattern having a notch portion; a step for dropping the liquid crystal on the plane of at least one of the panel substrate on which the electrode is formed, with a predetermined dropping pattern; a step for superposing both of the panel substrates upon another while sandwiching the sealing material and the liquid crystal between both of the panel substrates; and a step for pressing both of the panel substrates against each other, wherein in the sealing material coating step, the sealing material surrounding a display area and a comparatively small non-display area is coated outside the display area used for displaying, which is the plane of the panel substrate where the electrode is formed, so that the small non-display area which continues to the display area is formed and a notch portion is formed on the outer periphery of the small non-display area, and in the substrate pressing step, an air bubble accommodation portion for accommodating residual gas is formed in the small non-display area after the panel substrates are superposed upon another.

Also, a preferable mode is one wherein a notch width of the notch portion is set so that the notch portion is blocked after both of the panel substrates are pressed against each other in the substrate pressing step.

Also, a preferable mode is one wherein the notch width of the notch portion is set so that the notch portion is blocked before the liquid crystal reaches the notch portion after starting to press both of the panel substrates in the substrate pressing step.

Also, a preferable mode is one wherein the notch width of the notch portion is set to be equal to an increased amount of a width of the sealing material or less, which is obtained by subtracting a width of the sealing material when the sealing material is coated in the sealing material coating step from a width of the sealing material after both of the panel substrates are pressed against each other in the substrate pressing step, and a notch width of the notch portion provided outside the small non-display area is set to a value smaller than a width of an opening between the display area and the small non-display area.

Also, a preferable mode is one wherein in the substrate pressing step, by pressing both of the panel substrates against each other, both of the panel substrates are compressively attached to each other, the liquid crystal is allowed to fill a layer-shaped space corresponding to the display area, the layer-shaped space being formed by both of the panel substrates and the sealing material, residual gas is exhausted from the layer-shaped space through the notch portion, and the notch portion provided in the sealing material coating step is blocked in a state where the residual gas is partially accommodated in the air bubble accommodation space.

With the above configurations, in the sealing material coating step, the notch widths of the notch portions are set so that the notch portions are blocked after both panel substrates are pressed against each other in the substrate pressing step. Therefore, the pressing of the panel substrates against each other, filling of the liquid crystal, the exhaustion of the residual gas, and sealing of the notch portion can be performed approximately at the same time in the same step. The present invention can contribute to shortening of manufacturing time and cost reduction without complicating manufacturing steps by providing a new step such as a sealing step.

The notch width of the notch portion is set in the sealing material coating step so that the notch portion is blocked before the liquid crystal reaches the notch portion in the substrate pressing step. Therefore, wasteful outflow of the liquid crystal can be prevented.

In addition, since the residual gas is exhausted through the notch portion while spreading the liquid crystal, degradation of quality of the liquid crystal panel due to the residual gas can be prevented, and the liquid crystal display panel of high quality can be manufactured.

The notch width of the notch portion is set to the increased amount of the width of the sealing material or less, whereby the notch portion is surely blocked, and hence the leakage of the liquid crystal can be surely prevented. Accordingly, the present invention can provide the method of manufacturing a liquid crystal display panel of high reliability.

The amount of the liquid crystal dropped in the liquid crystal dropping step is set to a volume approximately equal to the volume of the layer-shaped space formed by the panel substrates and the sealing material after the panel substrates are pressed against each other in the substrate pressing step, whereby the liquid crystal display panel can be manufactured by use of the liquid crystal material of an adequate amount without wasting the liquid crystal material.

Furthermore, the residual gas can be exhausted surely and effectively by determining the dropping pattern of the liquid crystal based on at least the dimensions of the display area.

Furthermore, the residual gas can be exhausted surely and effectively by determining the coating pattern of the sealing material based on at least the dimensions of the display area.

Still furthermore, the air bubble accommodation space is formed outside the display area, and the residual gas is collected in the air bubble accommodation space, whereby a quality of the liquid crystal display panel can be further enhanced.

BRIEF DESCRIPTION OF THE DRAWINGS

Other objects, features, and advantages of the present invention will become more apparent from the following detailed description when read in conjunction with the accompanying drawings, in which:

FIGS. 4A and 4B are explanatory views for explaining the method of manufacturing the liquid crystal display panel, in which FIG. 4A is an enlarged plan view obtained by enlarging a portion A of FIG. 1A, and FIG. 4B is a section view taken along a line E—E of FIG. 4A;

FIGS. 5A and 5B are explanatory views for explaining the method of manufacturing the liquid crystal display panel, in which FIG. 5A is an enlarged plan view obtained by enlarging a portion B of FIG. 1C, and FIG. 5B is a section view taken along a line F—F of FIG. 5A;

FIGS. 6A and 6B are explanatory views for explaining the method of manufacturing the liquid crystal display panel, in which FIG. 6A is an enlarged plan view obtained by enlarging a portion C of FIG. 2D, and FIG. 6B is a section view taken along a line G—G of FIG. 6A;

FIGS. 7A and 7B are explanatory views for explaining the method of manufacturing the liquid crystal display panel, in which FIG. 7A is an enlarged plan view obtained by enlarging a portion D of FIG. 2E, and FIG. 7B is a section view taken along a line H—H of FIG. 7A;

DESCRIPTION OF THE PREFERRED EMBODIMENTS

Best modes for carrying out the present invention will be described in further detail using an embodiment with reference to the accompanying drawings.

First Embodiment

Figure 1A:
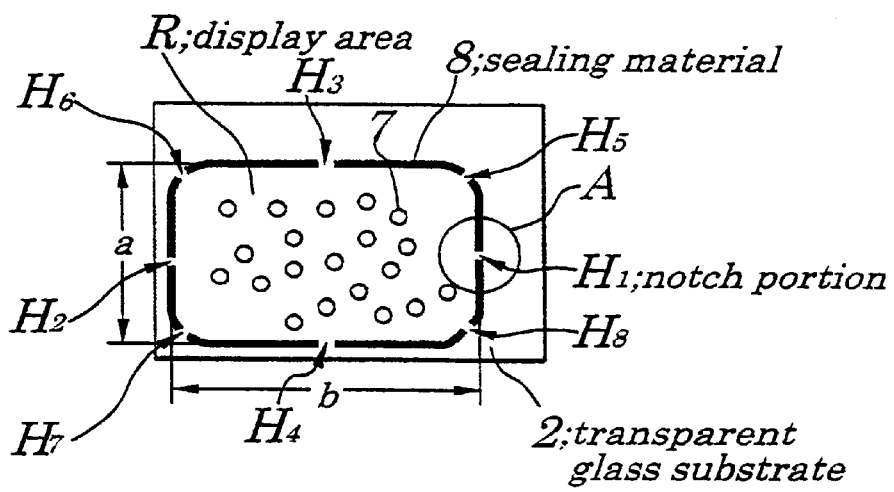
FIGS. 1A, 1B, and 1C are sequential diagrams for explaining a method of manufacturing a liquid crystal display panel according to a first embodiment of the present invention.
Figure 1B:
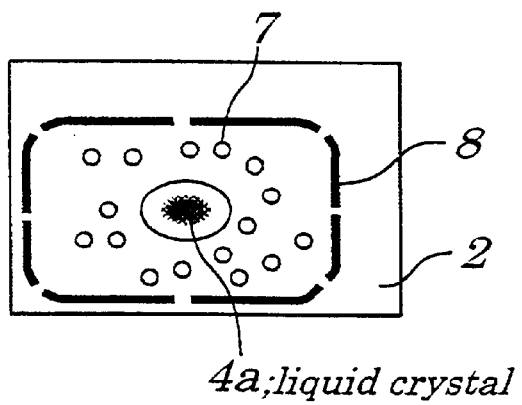
Figure 1C:
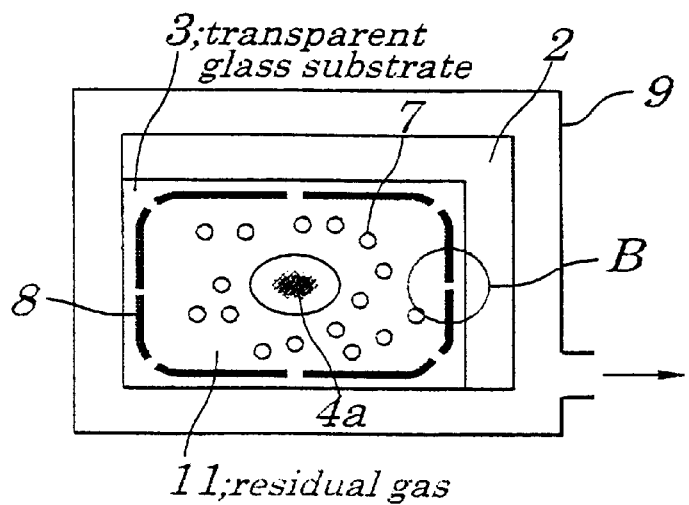
Figure 2D:
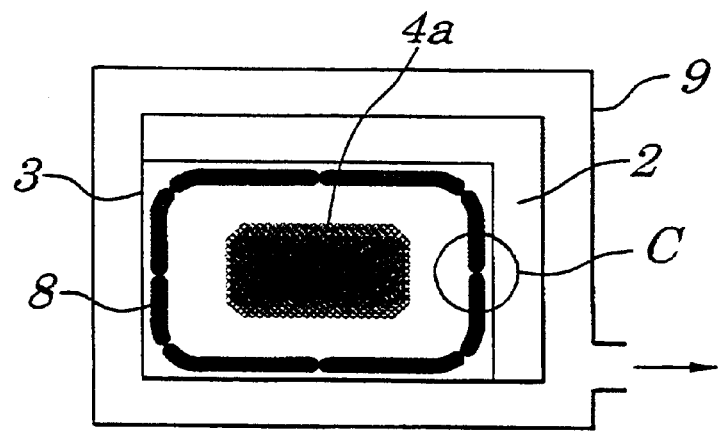
FIGS. 2D and 2E are sequential diagrams for explaining the method of manufacturing the liquid crystal display panel.
Figure 2E:
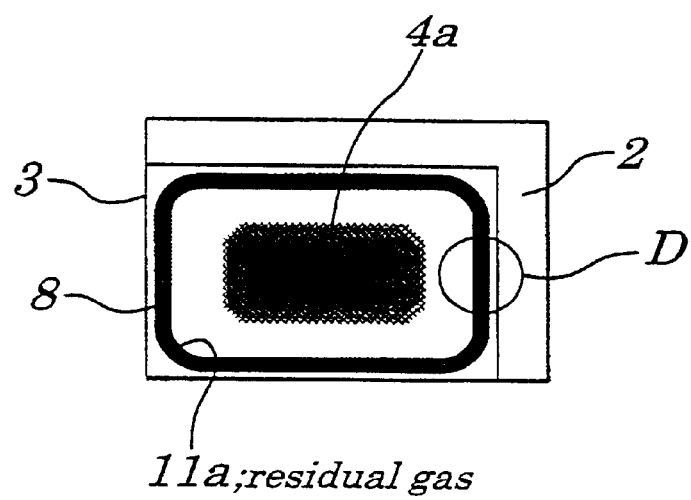
Figure 3:
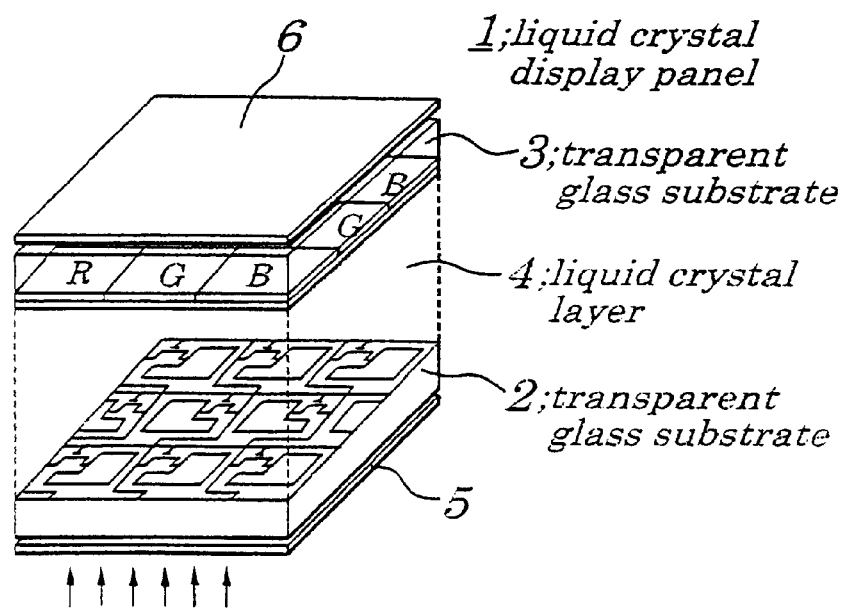
FIG. 3 is a perspective view schematically showing a constitution of the liquid crystal display panel.
Figure 4A:
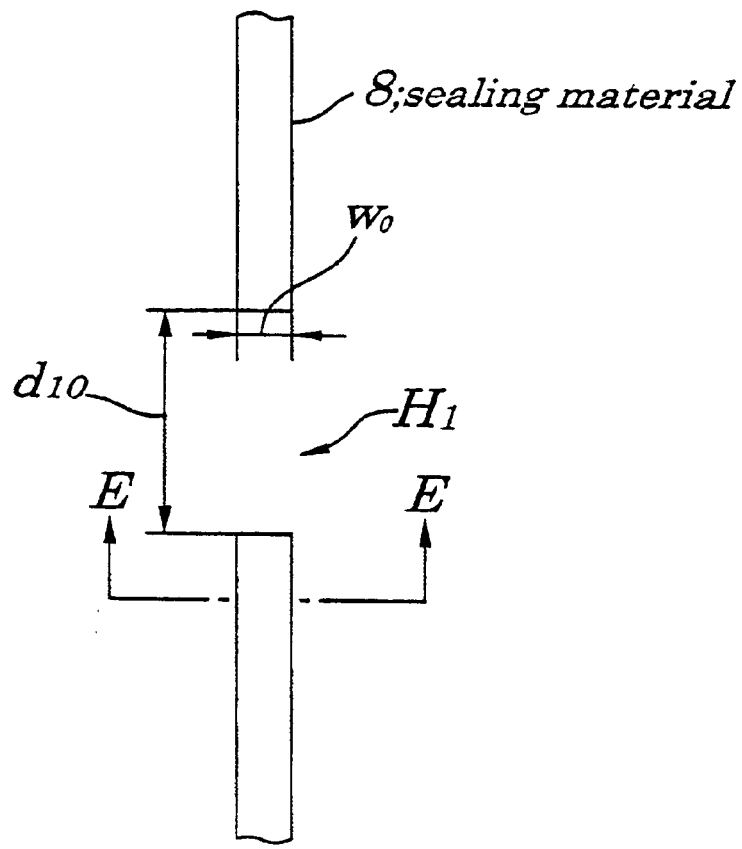
Figure 4B:
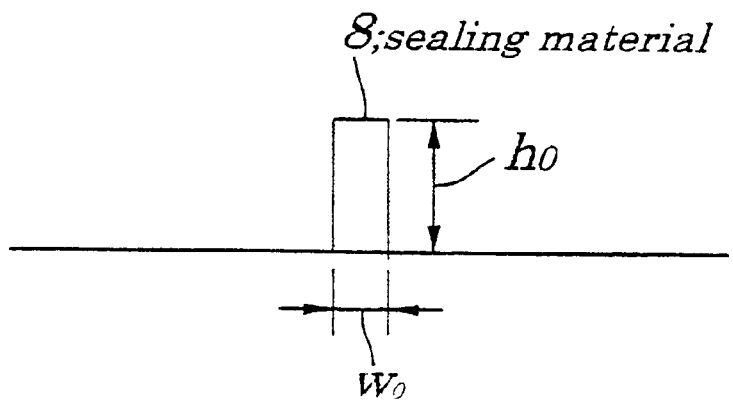
Figure 5A:
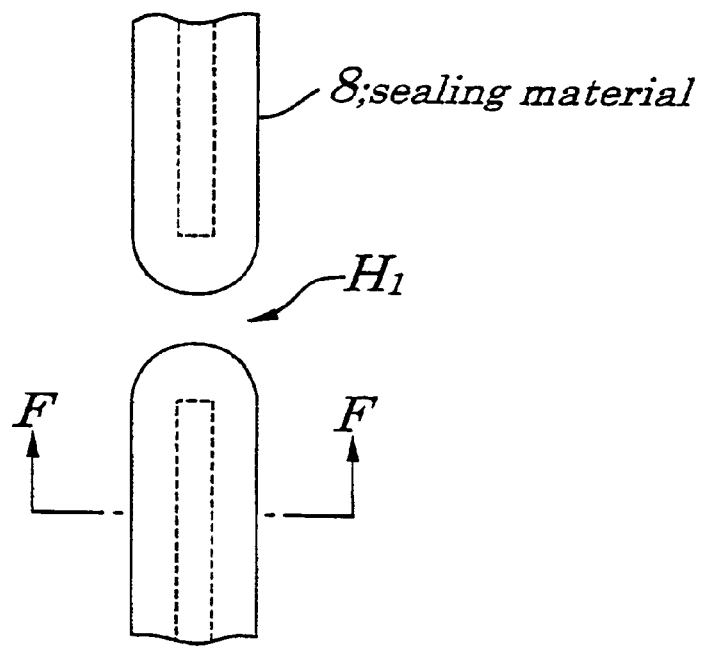
Figure 5B:
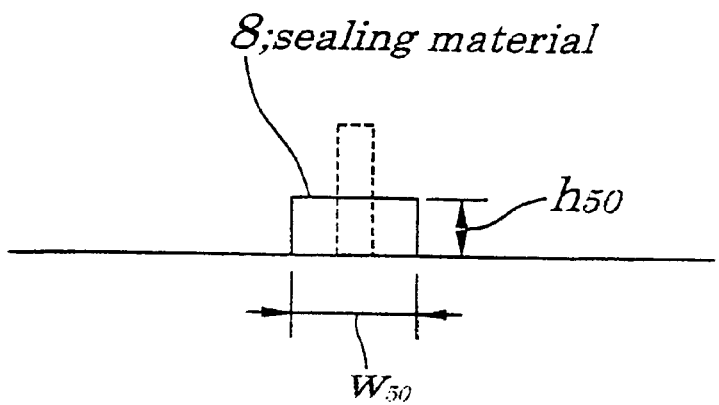
Figure 6A:
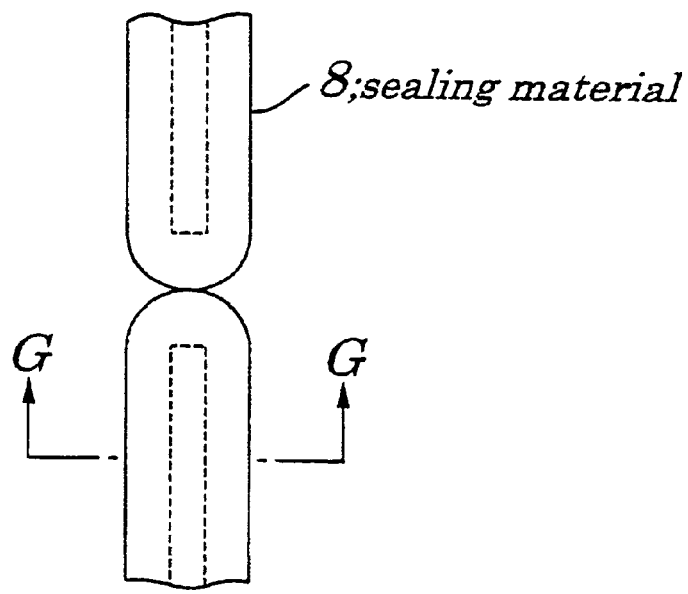
Figure 6B:
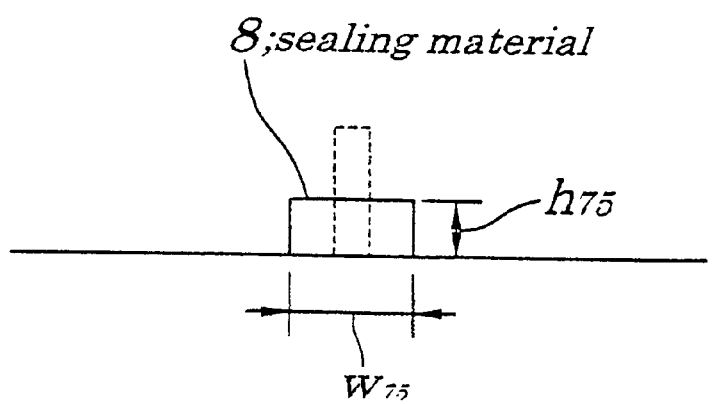
Figure 7A:
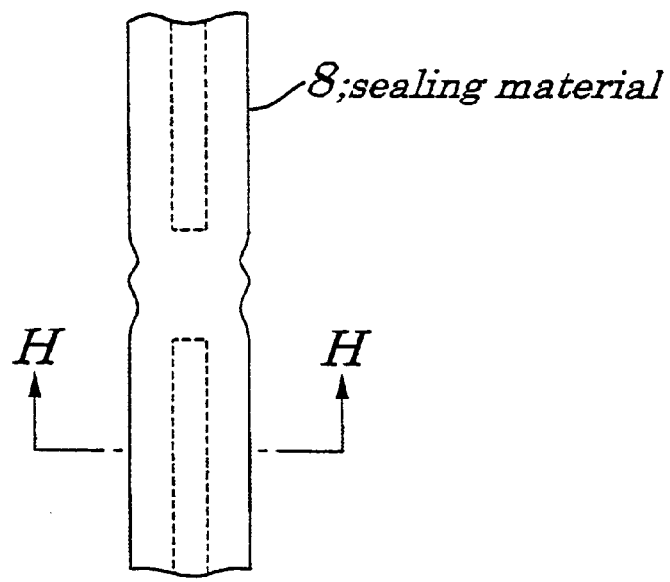
Figure 7B:
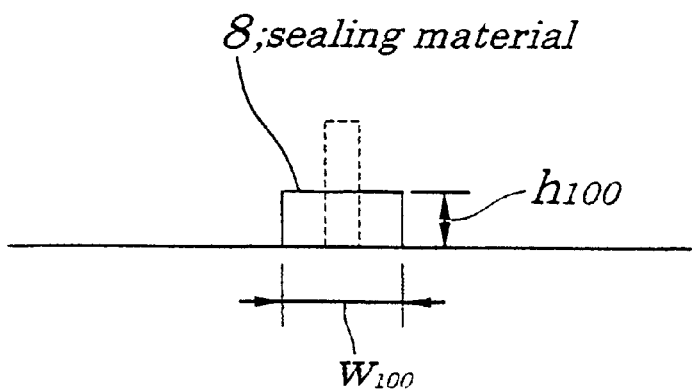
Figure 8A:
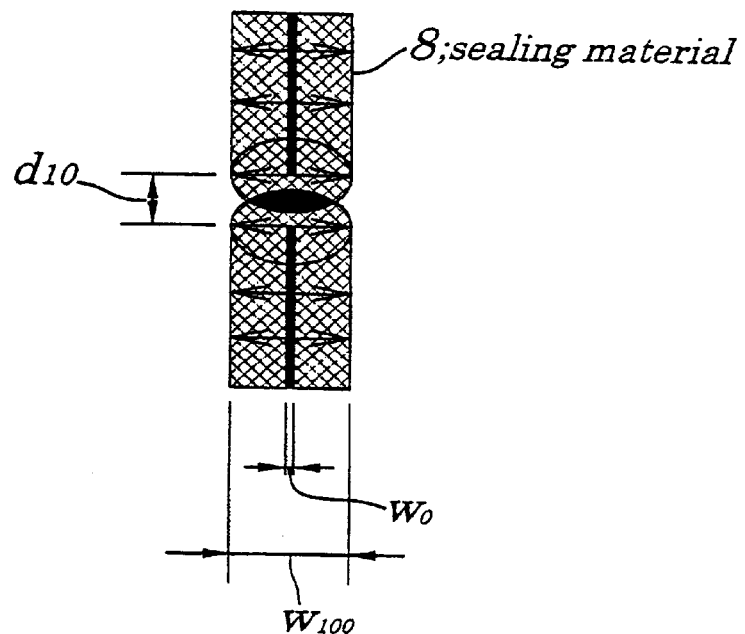
FIGS. 8A and 8B are explanatory views for explaining the method manufacturing the liquid crystal display panel.
Figure 8B:
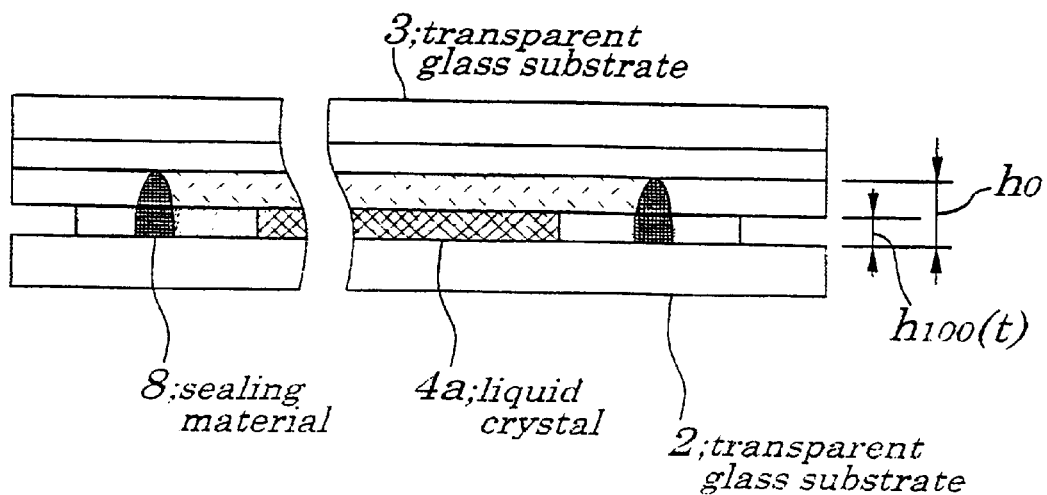

FIGS. 1A to 1C and FIGS. 2D and 2E are sequential diagrams for explaining a method of manufacturing a liquid crystal display panel according to a first embodiment of the present invention. FIG. 3 is a perspective view schematically showing a constitution of the liquid crystal display panel. FIGS. 4A and 4B are explanatory views for explaining the method of manufacturing the liquid crystal display panel. FIG. 4A is an enlarged plan view obtained by enlarging a portion A of FIG. 1A, and FIG. 4B is a section view taken along a line E—E of FIG. 4A. FIGS. 5A and 5B are explanatory views for explaining the method of manufacturing the liquid crystal display panel. FIG. 5A is an enlarged plan view obtained by enlarging a portion B of FIG. 1C, and FIG. 5B is a section view taken along a line F—F of FIG. 5A. FIGS. 6A and 6B are explanatory views for explaining the method of manufacturing the liquid crystal display panel. FIG. 6A is an enlarged plan view obtained by enlarging a portion C of FIG. 2D, and FIG. 6B is a section view taken along a line G—G of FIG. 6A. FIGS. 7A and 7B are explanatory views for explaining the method of manufacturing the liquid crystal display panel. FIG. 7A is an enlarged plan view obtained by enlarging a portion D of FIG. 2E, and FIG. 7B is a section view taken along a line H—H of FIG. 7A. FIGS. 8A and 8B are explanatory views for explaining the method of manufacturing the liquid crystal display panel.

A liquid crystal display panel 1 of this embodiment is, for example, a transmission-type TFT panel. As shown in FIG. 3, the liquid crystal display panel 1 includes: a pair of transparent glass substrates (panel substrate) 2 and 3 fixed opposite to each other with a gap of several microns, for example, 5 μm therebetween; a liquid crystal layer 4 sealed in the gap; and a pair of polarization plates 5 and 6 arranged outside respective transparent glass substrates 2 and 3.

On one transparent glass substrate 2, signal lines and scanning lines are arranged in a matrix fashion, and a thin film transistor (hereinafter referred to as a TFT) and a pixel electrodes are connected to each crossing point of the signal lines and the scanning lines. On the other transparent glass substrate 3, a common electrode and a color filter are arranged, and electrode formation planes of the transparent glass substrates 2 and 3 are arranged so as to face to each other.

Next, a method of manufacturing a liquid crystal display panel 1 according to a first embodiment will be described with reference to FIGS. 1A to 1C, FIGS. 2D and 2E, FIGS. 4A and 4B, and FIGS. 8A and 8B.

First, a sealing material coating step is performed. In this step, as shown in FIG. 1A, FIGS. 4A and 4B, and FIGS. 8A and 8B, on the transparent glass substrate 2, scattered are spacers 7 of a height t for defining a gap (a thickness of the liquid crystal layer 4) between the transparent glass substrates 2 and 3, so that the gap between the transparent glass substrates 2 and 3 is equal to a prescribed value t when a compressive attachment of the transparent glass substrates 2 and 3 is completed in a later described substrate pressing step. Thereafter, a sealing material 8 made of, for example, ultraviolet-curing resin is coated onto the transparent glass substrate 2 with an almost angular ring coating pattern, so that the sealing material 8 surrounds an almost rectangular display area R (hereinafter called display area R) of a predetermined longitudinal dimension a and a predetermined lateral dimension b.

The longitudinal dimension a and the lateral dimension b are set so that an aspect ratio (a:b) is equal to 1:1, 4:5, 3:4, and the like. For example, in the case of a 14-inch type liquid crystal display panel, the longitudinal dimension a of the display area R is set to 216.1 mm, and the lateral dimension b thereof is set to 287.5 mm. Furthermore, the height t is set to, for example, several microns.

Herein, the sealing material 8 is coated so that the sealing material 8 has a predetermined initial sealing height h0 and a predetermined initial sealing width w0, and so that notch portions $H_1$ to $H_8$ for exhausting a residual gas (air bubble) 11 in a later described substrate pressing step are formed in plural spots. Noted that the initial sealing height h0 and the initial sealing width w0 shall be set to, for example, several tens of microns to several hundreds of microns.

Furthermore, the notch portions $H_1$ to $H_8$ are provided at, for example, the central portions of the four sides and the four corner portions of the four sides, and have predetermined initial notch widths d10, d20, . . . and d80. The initial notch widths d10, d20, d30, . . . and d80 of the notch portions $H_1$ to $H_8$ are previously set so that when the liquid crystal 4a comes to fill the gap between the transparent glass substrates 2 and 3 by pressing them against each other in the later described substrate pressing step, and then a liquid crystal 4a reaches the notch portions $H_1$ to $H_8$, the sealing material 8 is widened and the notch portions $H_1$ to $H_8$ are surely blocked.

In general, in the case where the initial notch width of the notch portion is set to a value approximately 0.75 times an increased amount of the sealing width, the sealing width of the portion of the sealing material 8 where each notch portion $H_1$ to $H_8$ is blocked is approximately equal to the sealing width of other portion of the sealing material 8, and the liquid crystal 4a is sealed with a sufficient strength when the compressive attachment of the transparent glass substrates 2 and 3 is completed.

Specifically, in the case where the initial notch width is larger than approximately 0.75 times an increased amount of the sealing width, a sealing effect is lowered, so that the initial notch width must be set to be smaller than at least approximately 0.8 times the increased amount of the sealing width. On the other hand, in the case where the initial notch width is smaller than approximately 0.75 times an increased amount of the sealing width, the residual gas 11 is not exhausted well; therefore the initial notch width must be set to be larger than at least approximately 0.5 times the increased amount of the sealing width.

Accordingly, in this embodiment, the initial notch widths d10 and d20 of the notch portions $H_1$ and $H_2$ provided in the central portion of the longitudinal sides are set to be 0.75 times the increased amount $\Delta w$ of the sealing width that is the difference between the sealing width 100 of the sealing material 8 at the time of completion of the compressive attachment of the transparent glass substrates 2 and 3 and the initial sealing width w0. That is, the initial notch widths d10 and d20 are set to 0.75 $\Delta w$.

Furthermore, in this embodiment, a coating pattern of the sealing material 8 having an approximately angular ring shape corresponding to dimension and shape of the display area R is adopted. In a later described liquid crystal dropping step, adopted is a dropping pattern in which the liquid crystal 4a is dropped collectively onto the central portion of the display area R so as to correspond to the coating pattern. The liquid crystal 4a is spread and the residual gas 11 is dispersed to be guided toward the four corner portions of the coating pattern in the later described substrate pressing step, and in this step, the residual gas 11 is exhausted to the outside. In the substrate pressing step, the liquid crystal 4a first reaches the notch portions $H_3$ and $H_4$ provided in the central portions of the lateral sides of the coating pattern, and reaches the notch portions $H_1$ and $H_2$ provided in the central portions of the longitudinal sides thereof. Finally, the liquid crystal 4a reaches the notch portions $H_5$ to $H_8$, provided in the four corner portions of the coating pattern.

For this reason, in the course where the liquid crystal 4a fills the gap between the transparent glass substrates 2 and 3, the initial notch width of the notch portions which the liquid crystal 4a reaches earlier than other notch portions is set to be narrower. Specifically, the initial notch widths of the notch portions are set to satisfy the following inequality.

$$d30(=d40)<d10(=d20)<d50(d60=d70=d80)$$

In this embodiment, mainly based on the gap between the position where the liquid crystal 4a is dropped and the notch portions $H_3$ and $H_4$, the initial notch widths d30 and d40 of the notch portions $H_3$ and $H_4$ are set to 0.5 times the increased amount $\Delta w$ of the sealing width of the sealing material 8, specifically set to 0.5 $\Delta w$.

Furthermore, at the four corner portions of the coating pattern, the sealing material 8 is coated so that the sealing material 8 draws an arc, and the notch portions $H_5$ to $H_8$ at these spots are blocked earlier than those provided in the sides of the coating pattern.

Accordingly, in this embodiment, in consideration for that the residual gas 11 is exhausted through the notch portions $H_5$ to $H_8$ after starting to block the notch portions $H_1$ and $H_2$, the initial notch widths d50, d60, d70, and d80 of the notch portions $H_5$ to $H_8$ are set to 0.8 times the increased amount $\Delta w$ of the sealing material 8, specifically, set to 0.8 $\Delta w$.

Noted that the sealing width w100 shall be, for example, several hundred microns to several millimeters.

Next, the description moves on to a liquid crystal dropping step. In this step, as shown in FIG. 1B, the liquid crystal 4a is dropped in, for example, the central portion of the display area R surrounded by the sealing material 8. A quantity VL of the liquid crystal 4a dropped is preferably equal to a volume V0 (=abt) of the space between the transparent glass substrates 2 and 3, the space being formed when the transparent glass substrates 2 and 3 are pressed against each other until the gap between the transparent glass substrates 2 and 3 becomes equal to a prescribed value t, that is, at the time when the compressive attachment of the transparent glass substrates 2 and 3 is completed. In consideration for a volume of the space and variations in manufacturing the liquid crystal display panel 1, a quantity of the liquid crystal 4a actually dropped is preferably within a range, of 100 to 110% of the volume V0, more preferably, within the range of more than 100% of the volume V0 to 103% of the volume V0 or less.

Specifically, if a quantity of the liquid crystal 4a dropped is equal to 100% of the volume V0, spots which are not filled with the liquid crystal 4a occur due to variations in manufacturing the liquid crystal display panel 1, causing a drawback of an increased amount in a volume occupied by the residual gas 11 may be created. Furthermore, if a quantity of the liquid crystal 4a is more than 110% of the volume V0, a drawback occurs that the prescribed thickness t at the time when the compressive attachment of the transparent glass substrates 2 and 3 is completed, and that the liquid crystal 4a overflows to the outside of the sealing material 8.

If a quantity of the liquid crystal is more than 100% of the volume V0 and equal to 103% of the volume V0 or less, a latitude of a variation in the thickness is within an allowable value of 3%, even if total height is not equal to the prescribed value t when the compressive attachment of the transparent glass substrates 2 and 3 is completed, and hence this does not affect displaying.

Next, the description moves on to a substrate pressing step. In this step, as shown in FIG. 1C, the transparent glass substrate 2 mounting the liquid crystal 4a thereon is inserted to a vacuum decompression bath 9, and the vacuum decompression bath 9 is decompressed to the predetermined pressure p1, for example, 1 Pa. Thereafter, the transparent glass substrate 3 is superposed on the transparent glass substrate 2, and then pressing of both of the transparent glass substrates 2 and 3 against each other from both sides thereof starts by the use of an apparatus (not shown) such as a pressing machine using a cylinder. When the pressing starts, the residual gas 11 of a volume V1 mainly occupies a space around the liquid crystal 4a between the transparent glass substrates 2 and 3.

After the start of the pressing, the sealing width of the sealing material 8 is widened to the sealing width w50 that is 50% of the increased amount $\Delta w$ at the completion of the compressive attachment of the transparent glass substrates 2 and 3, and the sealing material 8 is crushed so as to have the sealing height. Then, the sealing material 8 deforms at the notch portions $H_1$ and $H_2$, for example, as shown in FIGS. 5A and 5B. Note that the state (shown in FIGS. 4A and 4B) of the sealing material 8 at the time when the pressing starts is shown by dotted lines in FIGS. 5A and 5B, FIGS. 6A and 6B, and FIGS. 7A and 7B.

When both of the transparent glass substrates 2 and 3 are further pressed against each other, the transparent glass substrates 2 and 3 are compressively attached with the sealing material 8 interposed therebetween, and the liquid crystal 4a spreads toward the peripheral portion while pushing out the residual gas 11 around it. At the same time, the sealing material 8is crushed and extended, and the notch portions $H_1$ to $H_8$ disappear as shown in FIG. 2D. Space surrounded by both of the transparent glass substrates 2 and 3 and the sealing material 8 is blocked. At this time, the liquid crystal 4a fills the space, and the residual gas (air bubble) 11 is exhausted through the notch portions $H_1$ to $H_8$.

The seal width of the sealing material 8 is widened to the sealing width w50 that is 75% of the increased amount Δw at the completion of the compressive attachment of the transparent glass substrates 2 and 3, and the sealing material 8 is crushed so as to have the sealing height h75. Then, the sealing material 8 deforms at the notch portions $H_1$ and $H_2$, for example, as shown in FIGS. 6A and 6B. At this time, the notch portions $H_1$ and $H_2$ are blocked.

Other notch portions $H_3$ to $H_8$ are similarly blocked at predetermined timings.

Specifically, in this substrate pressing step, though the liquid crystal 4a in the central portion of the display area R first reaches the notch portions $H_3$ and $H_4$, the notch portions $H_3$ and $H_4$ are blocked prior to the arrival of the liquid crystal 4a at the notch portions $H_3$ and $H_4$. Thus, the residual gas (air bubble) 11 taken around the liquid crystal 4a at the time of the start of the pressing is divided in the right and left directions, and pushed out in a lateral direction accompanied with the spread of the liquid crystal 4a.

Both of the transparent glass substrates 2 and 3 are pressed against each other, the liquid crystal 4a flows toward the notch portions $H_1$ and $H_2$, thus allowing the residual gas (air bubble) 11 to discharge through the notch portions $H_1$, $H_5$, and $H_8$ and the notch portions $H_2$, $H_6$, and $H_7$. Thereafter, when the notch portions $H_1$ and $H_2$ are blocked approximately just before the liquid crystal 4a reaches the notch portions $H_1$ and $H_2$ (see FIGS. 7A and 7B), the residual gas (air bubble) 11 divided into the right and left directions is further divided upward and downward, and pushed out by the liquid crystal 4a spreading toward the notch portions $H_5$ to $H_8$ by the pressing. Consequently, the residual gas 11 is exhausted outside through the notch portions $H_5$ to $H_8$.

Then, these notch portions $H_5$ to $H_8$ are blocked approximately just before the liquid crystal 4a reaches the notch portions $H_5$ to $H_8$.

The pressing force is further applied to the transparent glass substrates 2 and 3. As shown in FIG. 2E, both of the transparent glass substrates 2 and 3 are pressed against each other so as to be compressively attached until the gap between the transparent glass substrates 2 and 3 becomes equal to the height t of the spacers 7, and pressure in the vacuum decompression bath 9 is restored to atmospheric pressure p0.

When the compressive attachment of the transparent glass substrates 2 and 3 is completed, the sealing material 8 is extended so as to have the sealing width w100, and crushed so as to have the sealing height h100. At this time, for example, the sealing member 8 deforms in the notch portions $H_1$ and $H_2$, as shown in FIGS. 7A and 7B and FIG. 8A and 8B, and the notch portions $H_1$ and $H_2$ are completely blocked. Noted that the sealing height h100 at this time is equal to the prescribed value t.

At this time, a very small amount of the residual gas (air bubble) 11 remains in the four corner portions of the display area R.

In the case where a=216.1 mm, b=287.5 mm, t=0.005 mm, h0=0.03 mm and p1=1 Pa, a prescribed amount VL (=abt) is equal to 310.65 mm³. In the case where w0=0.3 mm, h0=0.03 mm, w100=1.8 mm and h100=0.005 mm, the height at the time when all of the notch portions $H_1$ to $H_8$ are blocked, that is, height ha at the time when each of the notch portions $H_5$ to $H_8$ is block height, ha is expressed by w0h0/(0.8 Δw+w0) and equal to 0.006 mm. Accordingly, a volume Va of a residual gas (air bubble) 11a (FIG. 2E) remaining in one corner portion at the time when all notch portions $H_1$ to $H_8$ are blocked is expressed by (abha−VL)/4, and calculated as 15.53 mm³.

Assuming that p0 is equal to $1.013 \times 10^5$ Pa, volume V2 of the residual gas (air bubble) 11 at the completion of the compressive attachment of the transparent glass substrates 2 and 3 is expressed by Vap1/p0, and calculated as $1.53 \times 10^{-4}$ mm³. When it is assumed that a shape of the residual gas (air bubble) 11a is cylindrical, a cross section Sa (=Va/t) of the residual gas (air bubble) 11a is 0.0306 mm², and the diameter f thereof is 0.197 mm. Accordingly, the residual gas (air bubble) 11a is negligible.

Next, description moves on to an ultraviolet ray radiation step. In this step, ultraviolet ray are radiated with an ultraviolet ray lamp, and thus sealing is completed by curing the sealing material 8. Thus, in a state where the residual gas 11 is are almost exhausted, the liquid crystal 4a never leaks outside the sealing material 8, and is sealed between the transparent glass substrates 2 and 3 which have been compressively attached to each other through the sealing material 8.

Thereafter, the liquid crystal display panel 1 is obtained through a cutting step and an inspection step. This liquid crystal display panel 1 is further introduced into a module step including a terminal connecting step, a print board mounting step, and the like, and a liquid crystal display device is completed.

As described above, according to the constitution of the liquid crystal display panel 1 in this embodiment, the liquid crystal 4a spreads in the step for pressing both of the transparent glass substrates 2 and 3 against each other, and the notch widths d10, d20, d30, . . . and d80 are previously set so that the notch portions $H_1$ to $H_8$ are blocked before the liquid crystal 4a reaches the notch portions $H_1$ to $H_8$. Accordingly, it is possible to prevent a waste of expensive liquid crystal material due to the outflow of the liquid crystal 4 through the notch portions $H_1$ to $H_8$.

In addition, since the residual gas (air bubble) is pushed out through the notch portions $H_1$ to $H_8$ accompanied with the spread of the liquid crystal 4, degradation of quality of the liquid crystal panel 1 due to remaining of the residual gas (air bubble) can be prevented, and the liquid crystal display panel 1 of high quality can be manufactured.

Furthermore, the notch portions d10, d20, d30, . . . and d80 are previously set so that by crushing the sealing material 8, the notch portions $H_1$ to $H_8$ are surely blocked at the time when the compressive attachment of the transparent glass substrates 2 and 3 is completed. Therefore, the notch portions $H_1$ to $H_8$ can be surely sealed, and the method of manufacturing the liquid crystal display panel 1 of high reliability can be provided.

Furthermore, the compressive attachment of the transparent glass substrates 2 and 3 with the sealing material 8 interposed therebetween, the filling of the liquid crystal 4a, the exhaustion of the t Residual gas 11 and sealing of the notch portions $H_1$ to $H_8$ can be executed almost at the same time by pressing the transparent glass substrates 2 and 3. Therefore, the present invention can contribute to, for example, shortening of the manufacturing time and cost reduction without complicating manufacturing steps by providing a new step such as a sealing step.

The coating pattern of the sealing material 8 is selected depending on the shape and the dimensions of the display area R, and the positions of the notch portions $H_1$ to $H_8$ and the notch widths d10, d20, d30, . . . and d80 thereof are set. Moreover, the dropping pattern of the liquid crystal 4a is selected, and the liquid crystal 4a is dropped in the central portion of the display area R. Therefore, the residual gas 11 can be surely and effectively exhausted.

Second Embodiment

Figure 9:
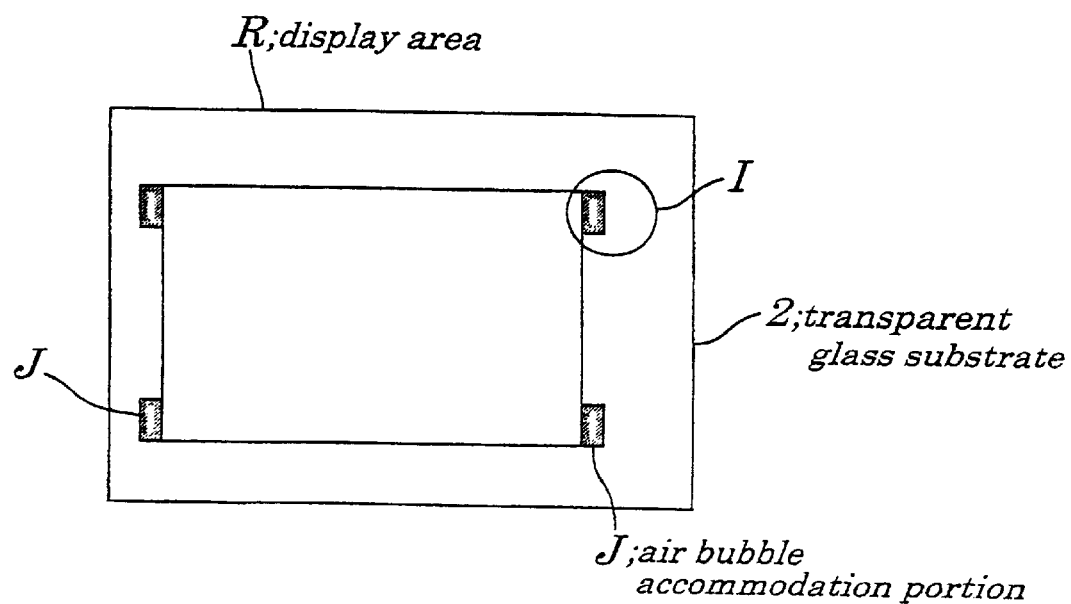
FIG. 9 is an explanatory view for explaining a method of manufacturing a liquid crystal display panel according to a second embodiment of the present invention.
Figure 10:
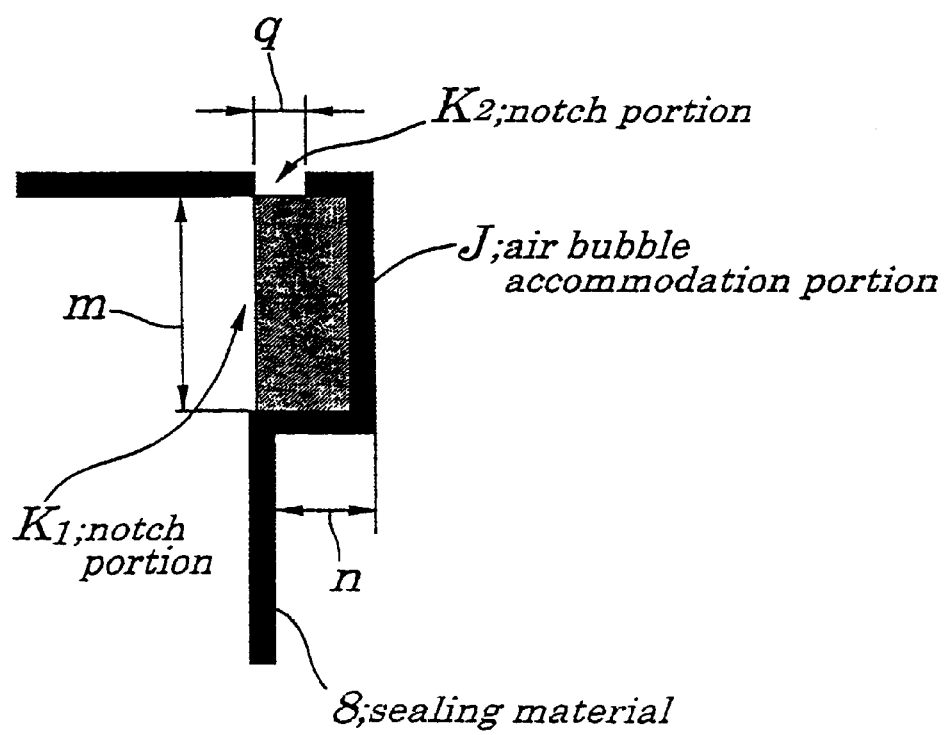
FIG. 10 is an enlarged plan view obtained by enlarging a portion I of FIG. 9.

FIG. 9 is an explanatory view for explaining a method of manufacturing a liquid crystal display panel according to a second embodiment of the present invention. FIG. 10 is an enlarged plan view obtained by enlarging a portion I of FIG. 9.

The second embodiment differs from the above-described first embodiment in that, as shown in FIG. 9 and FIG. 10, a sealing material 8 is coated at each of the four corners outside a display area R so as to form air bubble accommodation portions J in a sealing material coating step, the air bubble accommodation portions J having an exhaustion notch portion K2 for exhausting a residual gas (air bubble) 11, and serving to accommodate the residual gas (air bubble) 11 remaining without being exhausted.

The air bubble accommodation portion J is formed in a comparatively small non-display area R outside the display area. The air bubble accommodation portion J continues to the display area R.

Since the second embodiment has approximately the same constitution as that described in the first embodiment except for the above points, the description of the constitution of the second embodiment is made briefly.

In the sealing material coating step, a plurality of air bubble accommodation portions (air bubble accommodation spaces) J are formed. Each air bubble accommodation portion J is an area having a rectangular-shaped section, and has an inflow notch portion K1 for allowing the residual gas (air bubble) 11 to flow thereinto and the exhaustion notch portion K2 for exhausting the residual gas (air bubble) 11. Initial notch widths m and q of the inflow notch portion K1 and the exhaustion notch portion K2 are set so that m>q is satisfied. Moreover, the initial notch width q is approximately 0.75 times an increased amount Δw of a width of the sealing material 8 at the time when a compressive attachment of transparent glass substrates 2 and 3 is completed.

Furthermore, a cross section of each of air bubble accommodation portions J is set so that in a substrate pressing step to be performed later, the residual gas (air bubble) 11 of a predetermined volume is accommodated therein when the compressive attachment of the transparent glass substrates 2 and 3 is completed. Specifically, the cross section of each of air bubble accommodation portions J is set to a value corresponding to ¼ of a total volume of the residual gas (air bubble) 11 when the compressive attachment of the transparent glass substrates 2 and 3 is completed.

In the liquid crystal dropping step, the liquid crystal 4a of a prescribed amount VL is dropped in, for example, the central portion of the display area R. The prescribed amount VL in this embodiment is a volume including the display area R formed between the transparent glass substrates 2 and 3 at the time when the transparent glass substrates 2 and 3 are pressed against each other until the gap between the transparent glass substrates 2 and 3 becomes equal to a prescribed value t. The prescribed volume VL does not include a volume of the air bubble accommodation portion J.

In the substrate pressing step, both of the transparent glass substrates 2 and 3 are pressed against each other, the liquid crystal 4a spreads and the residual gas (air bubble) 11 is pushed out. The residual gas (air bubble) 11 temporarily flows into the air bubble accommodation portion J through the inflow notch portion K1 and then is exhausted through the exhaustion notch portion K2.

Both of the transparent glass substrates 2 and 3 are further pressed against each other, and the liquid crystal 4a reaches the inflow notch portion K1. Approximately at the same time, the exhaustion notch portion K2 is blocked, and the residual gas (air bubble) 11 is confined in the air bubble accommodation portion J. In this case, the liquid crystal 4a fills the gap between the transparent glass substrates 2 and 3, which corresponds to the display area R.

According to the constitution of this embodiment, effects approximately the same as those described in the first embodiment can be obtained.

In addition, since the air bubble accommodation portion J is provided outside the display area R, a quality of the liquid crystal display panel can be further enhanced by collecting the air bubbles in the air bubble accommodation portion J.

Even when timings at which corner portions are filled with the liquid crystal 4a are not coincident among the corner portions, errors of the timings are absorbed, and the display area R between the transparent glass substrates 2 and 3 is filled with a sufficient amount of the liquid crystal 4a. At the same time, it is possible to avoid adverse effects of the air bubbles on display quality.

Third Embodiment

Figure 11:
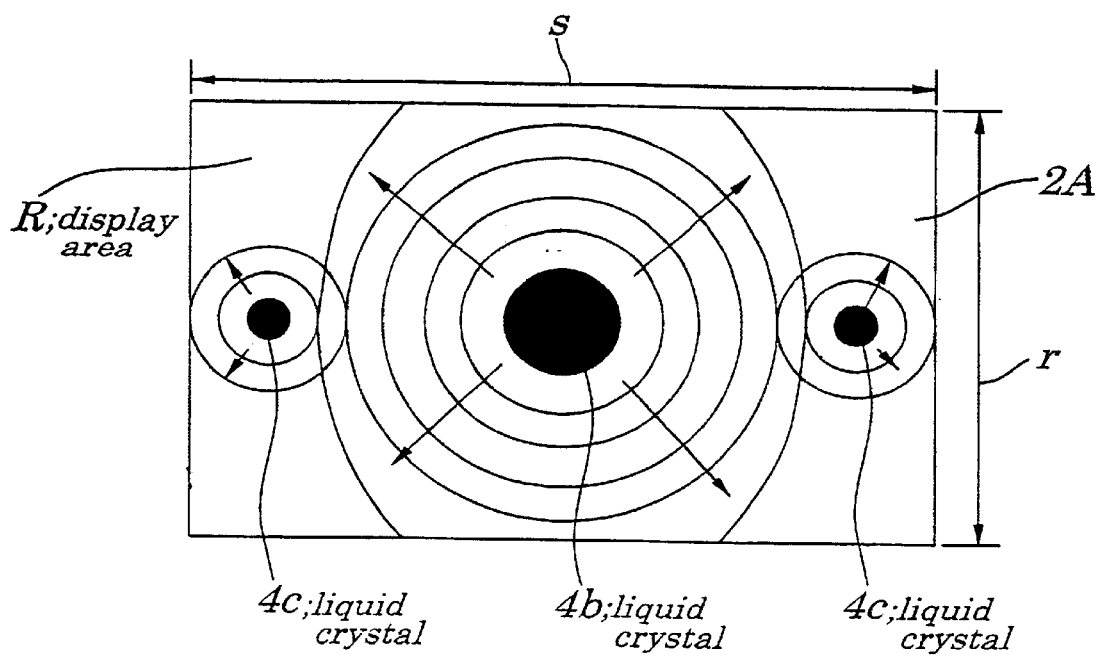
FIG. 11 is an explanatory view for explaining a method of manufacturing a liquid crystal display panel according to a third embodiment of the present invention.

FIG. 11 is an explanatory view for explaining a method of manufacturing a liquid crystal display panel according to a third embodiment of the present invention.

The third embodiment differs from the above-described first embodiment in the following point. Specifically, though liquid crystal is dropped in one spot, namely, in a central portion of a display area in the first embodiment, the liquid crystal is dropped divisionally in plural spots as shown in FIG. 11 so that the liquid crystal display panel of the third embodiment can be applied to, for example, a wide-screen television.

Since the third embodiment has approximately the same constitution as that described in the first embodiment except for the above points, the description of the constitution of the third embodiment is made briefly.

In a sealing material coating step, as shown in FIG. 11, after spacers 7 (not shown) are scattered on a transparent glass substrate 2A, a sealing material 8 (not shown) is coated so as to surround a display area R having an approximately rectangular shape of a predetermined longitudinal dimension r and a predetermined lateral dimension s. Herein, the longitudinal dimension r and the lateral dimension s are set so that an aspect ratio (r:s) is 10:16, 9:16 or a like. In addition, notch portions are provided in the four corner portions (not shown).

In the liquid crystal dropping step, as shown in FIG. 11, a liquid crystal 4b, 4a, and ac is divisionally dropped onto the display area R so as to correspond dimensions of the display area R. Specifically, a comparatively large amount of the liquid crystal 4b out of a prescribed volume VL is dropped onto the central portion of the display area R, and a comparatively small amount of a liquid crystal 4c and 4c out of the prescribed volume VL is dropped onto both sides of the central portion thereof.

In the substrate pressing step, when the transparent glass substrates 2A and another transparent glass (not shown) are pressed against each other, the liquid crystal 4b and 4c spread and residual gas (air bubble) 11 (not shown) is pushed out toward four corner portions of the display area R to be exhausted.

With this embodiment, effects approximately the same as those described in the first embodiment can be obtained.

In addition, the residual gas (air bubble) 11 can be exhausted effectively in accordance with, for example, a wide-screen television having a large aspect ratio.

It is apparent that the present invention is not limited to the above embodiments but may be changed and modified without departing from the scope and spirit of the invention.

For example, though the cases where the coating pattern of the sealing material 8 assumes approximately an angular ring shape were described in the foregoing embodiments, the present invention is not limited to this shape. The sealing material 8 may be coated so as to have a waved-line shape other than a straight line shape.

Furthermore, positions of the notch portions may not be only the four corner portions of the sealing material 8, and the number of the notch portions may be one.

Although initial notch widths d10 and d20 of notch portions $H_1$ and $H_2$ are set to 0.75 times an increased amount $\Delta w$ of a width of the sealing material 8 at the time when compressive attachment of the transparent glass substrates 2 and 3 is completed, the value of the widths d10 and d20 is not naturally limited to this, and the width d10 and d20 of the notch portions $H_1$ and $H_2$ may be equal to the increased amount $\Delta w$ of the width of the sealing material 8 or less. The same is true of other notch portions.

The liquid crystal display panel may be not only a transmission-type but also a reflection type. Moreover, thermosetting resin may be used as the sealing material 8.

Furthermore, the case where both of the transparent glass substrates 2 and 3 are pressed against each other while decompressing pressure of a vacuum decompression bath 9 to, for example, p1=1 [Pa] was described. However, a pressure of the vacuum decompression bath 9 is not limited to 1 [Pa], and the pressure of the vacuum decompression bath 9 may be further decompressed. To the contrary, the pressing may be carried out in atmospheric pressure.

In the second embodiment, a section shape of an air bubble accommodation portion J is a rectangular-shaped area. However, the section shape thereof may be triangluar, or may be semicircular. The shape of an inflow notch portion K1 is not limited to that shown in FIG. 10. For example, a longitudinal side extending along a display area R may protrude toward the air bubble accommodation portion while keeping the relation of m>q, the corner portion of the sealing material surrounding the air bubble accommodation portion J may be arc-shaped, and the inflow notch portion K1 may be narrowed toward the air bubble accommodation portion J while keeping the relation m>q.

Figure 12:
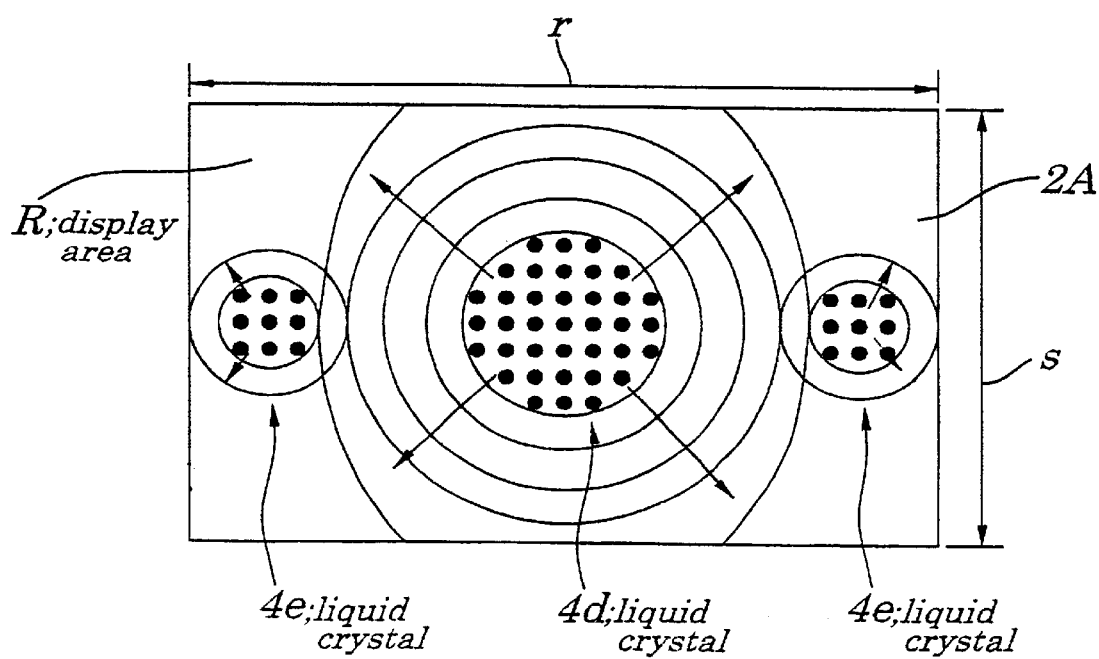
FIG. 12 is an explanatory view for explaining a method of manufacturing a liquid crystal display panel according to a modification example of the third embodiment of the present invention.

In the third embodiment, a case where liquid crystal is dropped collectively onto the three spots was described. As shown in FIG. 12, aggregates of the liquid crystal 4d, 4e, and 4e composed of fine dots may be dropped so as to correspond to the liquid crystal 4b, 4c, and 4c shown in FIG. 11.

Figure 13:
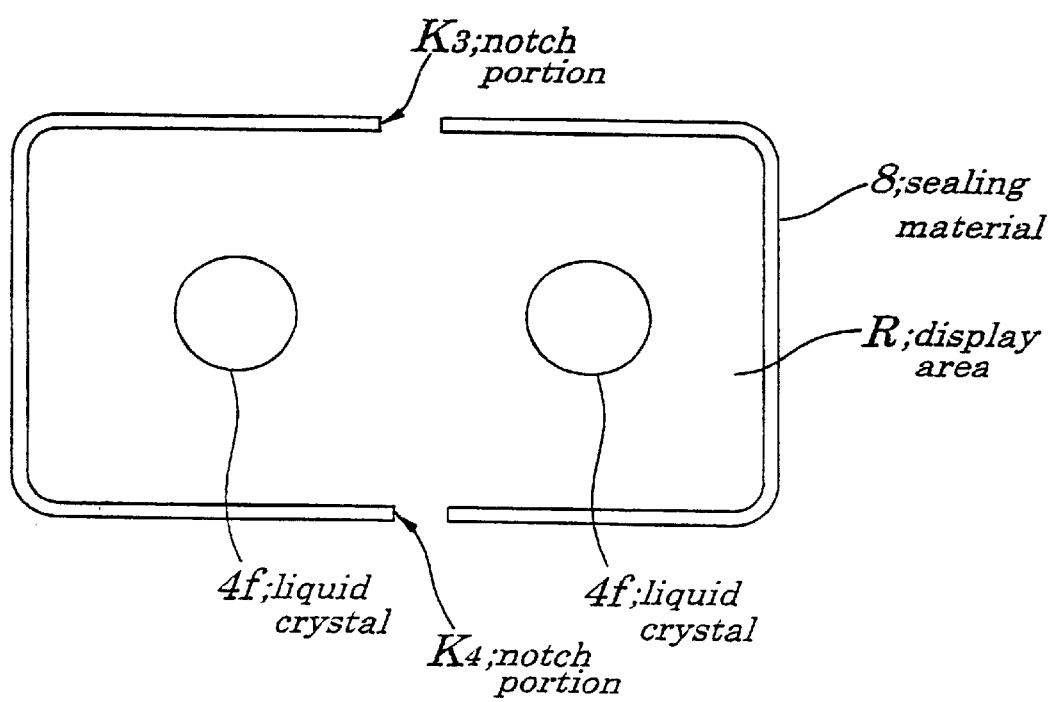
FIG. 13 is an explanatory view for explaining a method of manufacturing a liquid crystal display panel according to another modification example of the third embodiment of the present invention.
Figure 14A:
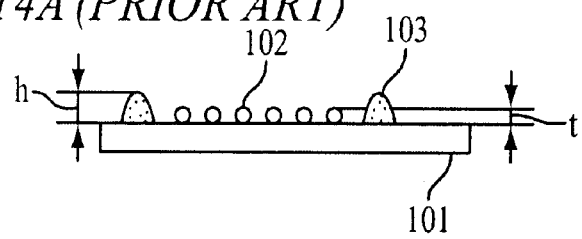
FIGS. 14A, 14B, 14C, and 14D are explanatory views for explaining a prior art.
Figure 14B:
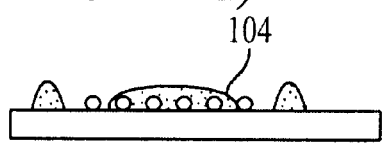
Figure 14C:
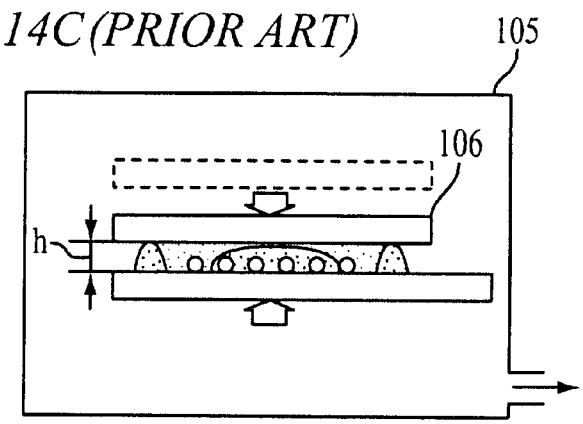
Figure 14D:
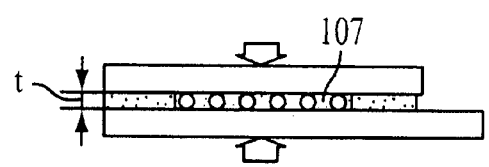
Figure 15:
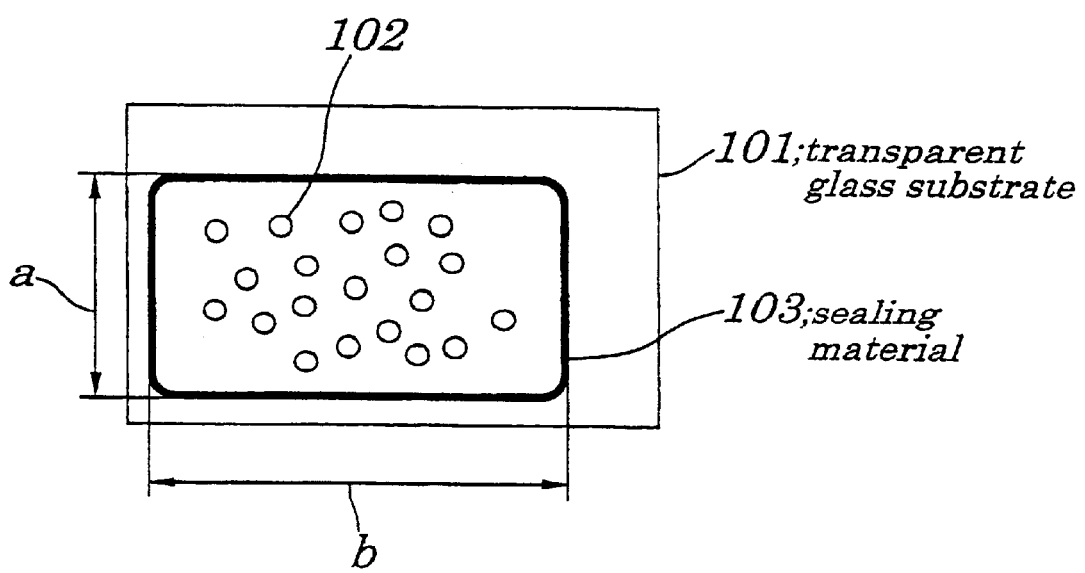
FIG. 15 is an explanatory view for explaining the prior art.
Figure 16A:
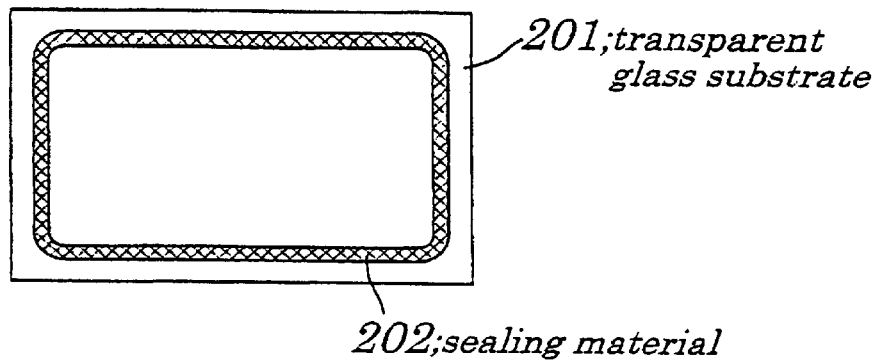
FIGS. 16A, 16B, and 16C are explanatory views for explaining the prior art.
Figure 16B:
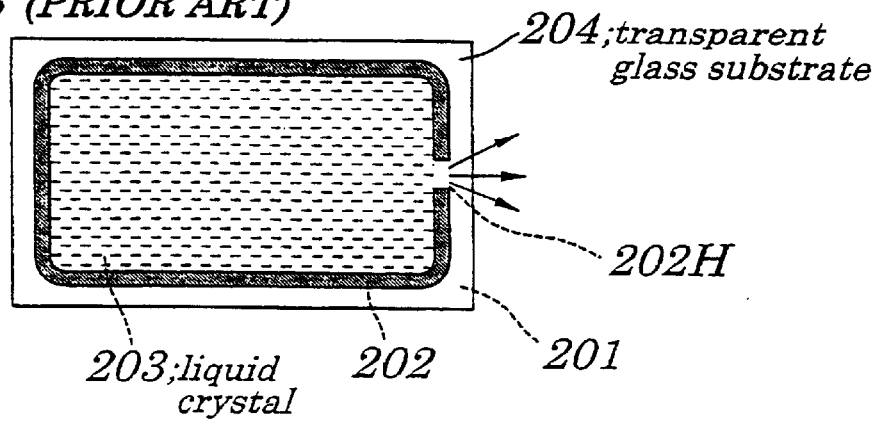
Figure 16C:
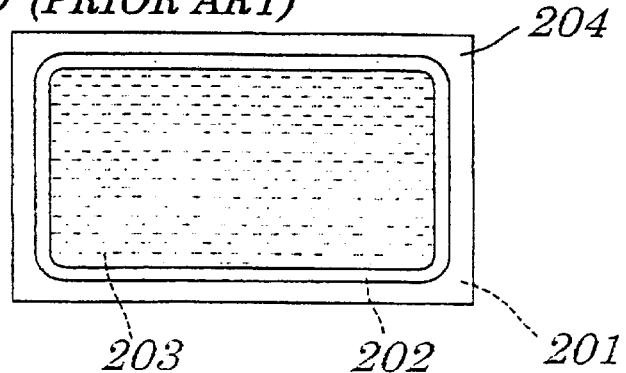
Figure 17A:
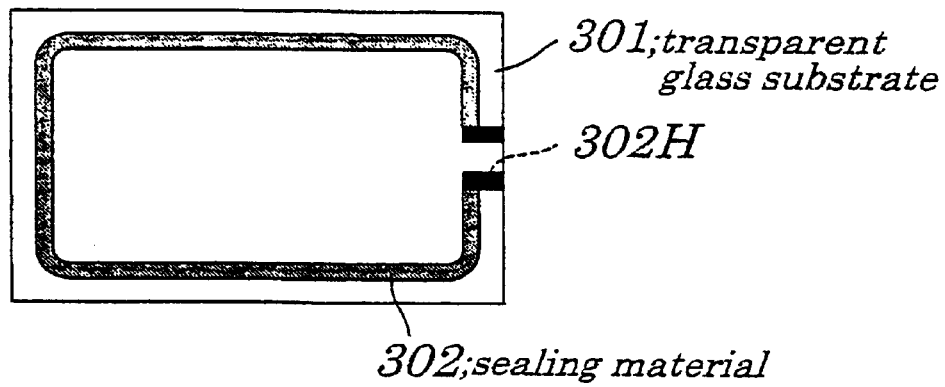
FIGS. 17A, 17B, and 17C are explanatory views for explaining another prior art.
Figure 17B:
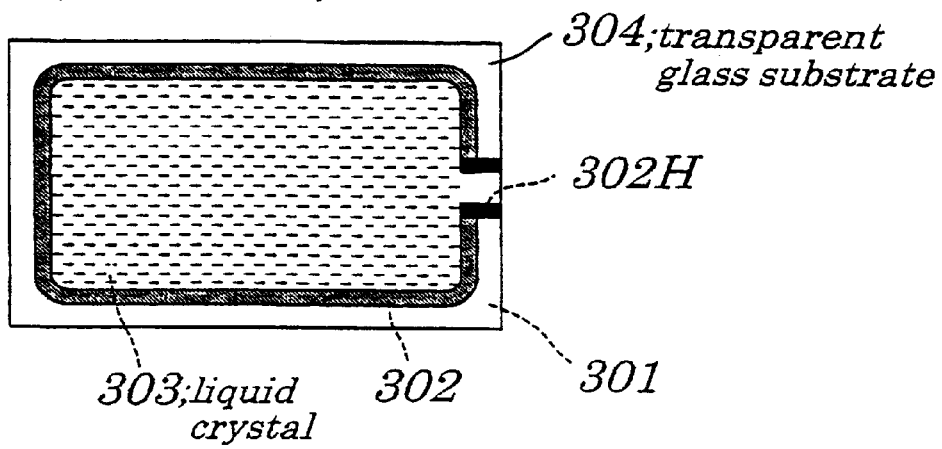
Figure 17C:
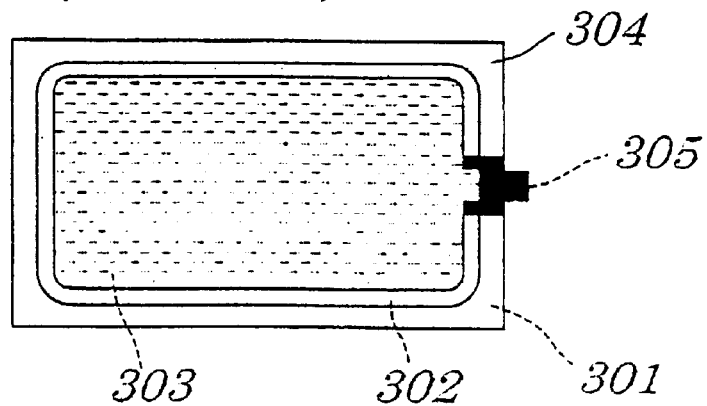

As shown in FIG. 13, liquid crystal is divisionally dropped onto both sides of the display area R as the liquid crystal 4f and 4f, and notch portions K3 and K4 may be provided in, for example, the central portions of the lateral sides so as to correspond this dropping pattern.

What is claimed is:

1. A method of manufacturing a liquid crystal display panel in which liquid crystal is held between a pair of panel substrates facing each other, on which an electrode is formed, comprising:
    a step for coating a sealing material on a plane of a least one of said panel substrates, on which the electrode is formed, with a predetermined coating pattern having a notch portion comprising a break between a first portion of said sealing material and a second portion of said sealing material;
    a step for dropping the liquid crystal on said plane of at least one of said panel substrates, on which said electrode is formed, with a predetermined dropping pattern;
    a step for superposing both of said panel substrates upon another while sandwiching said sealing material and said liquid crystal between said both of said panel substrates; and
    a step for pressing said both of said panel substrates against each other,
    wherein in said sealing material coating step, a notch width of said notch portion is set to a value so that said notch portion is blocked by said first portion of said sealing material and said second portion of said sealing material merging to block said break as a result of said both of said panel substrates being pressed against each other in said substrate pressing step.

2. The method of manufacturing a liquid crystal display panel according to claim 1, wherein in said sealing material coating step, said notch width of said notch portion is set so that said notch portion is blocked before said liquid crystal reaches said notch portion after starting to press said both of said panel substrates in said substrate pressing step.

3. A method of manufacturing a liquid crystal display panel in which liquid crystal is held between a pair of panel substrates facing each other, on which an electrode is formed, comprising:
    a step for coating a sealing material on a plane of a least one of said panel substrates, on which the electrode is formed, with a predetermined coating pattern having a notch portion;
    a step for dropping the liquid crystal on said plane of at least one of said panel substrates, on which said electrode is formed, with a predetermined dropping pattern;
    a step for superposing both of said panel substrates upon another while sandwiching said sealing material and said liquid crystal between said both of said panel substrates; and
    a step for pressing said both of said panel substrates against each other,
    wherein in said sealing material coating step, a notch width of said notch portion is set to a value so that said notch portion is blocked after said both of said panel substrates are pressed against each other in said substrate pressing step,
    wherein in said sealing material coating step, said notch width of said notch portion is set to be equal to an increased amount of a width of said sealing material or less, which is obtained by subtracting a width of said sealing material when said sealing material is coated in the sealing material coating step from a width of said sealing material after said both of said panel substrates are pressed against each other in said substrate pressing step.

4. The method of manufacturing a liquid crystal display panel according to claim 2, wherein in said sealing material coating step, a plurality of said notch portions are provided, and of two notch portions selected arbitrarily from said plurality of said notch portions, a notch width of one notch portion which the liquid crystal reaches earlier than another notch portion in said substrate pressing step is set to be smaller than that of said other notch portion which said liquid crystal reaches later.

5. A method of manufacturing a liquid crystal display panel in which liquid crystal is held between a pair of panel substrates facing each other, on which an electrode is formed, comprising:
    a step for coating a sealing material on a plane of a least one of said panel substrates, on which the electrode is formed, with a predetermined coating pattern having a notch portion;

a step for dropping the liquid crystal on said plane of at least one of said panel substrates, on which said electrode is formed, with a predetermined dropping pattern;

a step for superposing both of said panel substrates upon another while sandwiching said sealing material and said liquid crystal between said both of said panel substrates; and a step for pressing said both of said panel substrates against each other, wherein in said sealing material coating step, a notch width of said notch portion is set to a value so that said notch portion is blocked after said both of said panel substrates are pressed against each other in said substrate pressing step, wherein in said sealing material coating step, said notch width of said notch portion is set to be equal to an increased amount of a width of said sealing material or less, which is obtained by subtracting a width of said sealing material when said sealing material is coated in the sealing material coating step from a width of said sealing material after said both of said panel substrates are pressed against each other in said substrate pressing step, and wherein in said sealing material coating step, said notch width of said notch portion is set to approximately 0.75 times said increased amount of the width of said sealing material.

6. The method of manufacturing a liquid crystal display panel according to claim 1, wherein a quantity of said liquid crystal dropped in said liquid crystal dropping step is set to be equal to a volume of a layer-shaped space or less, which is formed by said both of said panel substrates and said sealing material immediately after said both of said panel substrates are superposed in said substrate pressing step.

7. The method of manufacturing a liquid crystal display panel according to claim 6, wherein said quantity of said liquid crystal dropped in said liquid crystal dropping step is set to be approximately equal to said volume of said layer-shaped space formed by said both of said panel substrates and said sealing material after said both of said panel substrates are pressed against each other in said substrate pressing step.

8. The method of manufacturing a liquid crystal display panel according to claim 6, wherein in said substrate pressing step, by pressing said both of said panel substrates against each other, said both of said panel substrates are compressively attached to each other, said liquid crystal is allowed to fill said layer-shaped space, residual gas is exhausted from said layer-shaped space through said notch portion, and said notch portion provided in said sealing material coating step is blocked.

9. The method of manufacturing a liquid crystal display panel according to claim 1, wherein in said liquid crystal dropping step, said predetermined dropping pattern is adopted based on at least dimensions of said display area used for displaying, which is said plane of said panel substrate where said electrode is formed.

10. The method of manufacturing a liquid crystal display panel according to claim 1, wherein in said sealing material coating step, said predetermined coating pattern is adopted based on at least said dimensions of said display area used for displaying, which is said plane of said panel substrate where said electrode is formed.

11. The method of manufacturing a liquid crystal display panel according to claim 9, wherein in said sealing material coating step, said sealing material is coated so as to show approximately an angular ring appearance with a predetermined width and a predetermined height.

12. The method of manufacturing a liquid crystal display panel according to claim 9, wherein in said sealing material coating step, said sealing material is coated so that said notch portion is formed at least in a corner of said display area, and in said liquid crystal dropping step, said liquid crystal is dropped on a central portion of said display area.

13. The method of manufacturing a liquid crystal display panel according to claim 11, wherein the dropping pattern of said liquid crystal is set based on an aspect ratio of said display area.

14. A method of manufacturing a liquid crystal display panel in which liquid crystal is held between a pair of panel substrates facing each other, on which an electrode is formed, comprising:

a step for coating a sealing material on a plane of at least one of said panel substrates, on which said electrode is formed, with a predetermined coating pattern having a notch portion;

a step for dropping said liquid crystal on said plane of at least one of said panel substrates, on which said electrode is formed, with a predetermined dropping pattern;

a step for superposing both of said panel substrates upon another while sandwiching said sealing material and said liquid crystal between said both of said panel substrates; and a step for pressing said both of said panel substrates against each other, wherein in said sealing material coating step, said sealing material surrounding a display area and a small non-display area is coated outside said display area used for displaying, which is said plane of said panel substrate where said electrode is formed, so that said small non-display area which continues to said display area is formed and a notch portion is formed on an outer periphery of said small non-display area, said notch portion comprising a break between a first portion of said outer periphery and a second portion of said outer periphery, and in said substrate pressing step, an air bubble accommodation portion for accommodating residual gas is formed in said small non-display area after said panel substrates are superposed upon another.

15. The method of manufacturing a liquid crystal display panel according to claim 14, wherein a notch width of said notch portion is set so that said notch portion is blocked after said both of said panel substrates are pressed against each other in said substrate pressing step.

16. The method of manufacturing a liquid crystal display panel according to claim 15, wherein said notch width of said notch portion is set so that said notch portion is blocked before said liquid crystal reaches said notch portion after starting to press said both of said panel substrates in said substrate pressing step.

17. A method of manufacturing a liquid crystal display panel in which liquid crystal is held between a pair of panel substrates facing each other, on which an electrode is formed, comprising:

a step for coating a sealing material on a plane of at least one of said panel substrates, on which said electrode is formed, with a predetermined coating pattern having a notch portion;

a step for dropping said liquid crystal on said plane of at least one of said panel substrates, on which said electrode is formed, with a predetermined dropping pattern;

a step for superposing both of said panel substrates upon another while sandwiching said sealing material and said liquid crystal between said both of said panel substrates; and a step for pressing said both of said panel substrates against each other, wherein in said sealing material coating step, said sealing material surrounding a display area and a small non-display area is coated outside said display area used for displaying, which is said plane of said panel substrate where said electrode is formed, so that said small non-display area which continues to said display area is formed and a notch portion is formed on an outer periphery of said small non-display area, and in said substrate pressing step, an air bubble accommodation portion for accommodating residual gas is formed in said small non-display area after said panel substrates are superposed upon another, wherein said notch width of said notch portion provided in said sealing material coating step is set to be equal to an increased amount of a width of said sealing material or less, which is obtained by subtracting a width of said sealing material when said sealing material is coated in said sealing material coating step from a width of said sealing material after said both of said panel substrates are pressed against each other in said substrate pressing step, and a notch width of said notch portion provided on a peripheral side of said small non-display area is set to a value smaller than a width of an opening between said display area and said small non-display area.

18. The method of manufacturing a liquid crystal display panel according to claim 14, wherein in said substrate pressing step, by pressing said both of said panel substrates against each other, said both of said panel substrates are compressively attached to each other, said liquid crystal is allowed to fill a layer-shaped space corresponding to said display area, said layer-shaped space being formed by said both of said panel substrates and said sealing material, residual gas is exhausted from said layer-shaped space through said notch portion, and said notch portion provided in said sealing material coating step is blocked in a state where said residual gas is partially accommodated in said air bubble accommodation space.

\* \* \* \* \*